United States Patent [19]

Kato et al.

[11] Patent Number: 5,205,579
[45] Date of Patent: Apr. 27, 1993

[54] HANDLE BAR FOR BABY CARRIAGE

[75] Inventors: Hitoshi Kato; Yuichi Arai, both of Tokyo, Japan

[73] Assignee: Combi Corporation, Tokyo, Japan

[21] Appl. No.: 863,515

[22] Filed: Mar. 31, 1992

Related U.S. Application Data

[63] Continuation of Ser. No. 770,813, Oct. 4, 1991, abandoned.

[30] Foreign Application Priority Data

Oct. 8, 1990 [JP] Japan ............... 2-105279[U]

[51] Int. Cl.$^5$ .............................................. B62D 7/08
[52] U.S. Cl. ..................................... 280/642; 74/502; 297/376; 297/DIG. 4
[58] Field of Search ............... 280/642, 643, 644, 647, 280/42, 649, 650, 657, 658; 74/491, 501.6, 502, 376; 403/339, 340, 344; 297/61, 356, 377, 408, DIG. 4, 376

[56] References Cited

U.S. PATENT DOCUMENTS

| 4,216,974 | 8/1980 | Kassai | 280/42 |
| 4,660,850 | 4/1987 | Nakao et al. | 280/642 |
| 4,733,882 | 3/1988 | Kassai | 280/642 |
| 4,805,928 | 2/1989 | Nakao et al. | 280/642 |
| 4,832,361 | 5/1989 | Nakao et al. | 280/647 |
| 4,906,017 | 3/1990 | Kassai | 280/642 |

FOREIGN PATENT DOCUMENTS 0257588 3/1988 European Pat. Off.
815454 10/1951 Fed. Rep. of Germany.

*Primary Examiner*—Richard M. Camby
*Attorney, Agent, or Firm*—Sughrue, Mion, Zinn, Macpeak & Seas

[57] ABSTRACT

An operating mechanism disposed on a handle bar of a baby carriage for actuating locking mechanisms disposed at opposite ends of the handle bar and which locks the handle bar at a predetermined position or locks the baby carriage in a folded or an unfolded position. The handle bar has a hollow tubular construction and is bent in a U-shape or an inverted U-shape as viewed from its front. The operating mechanism includes a pair of slide members each of which is slidably disposed at the central portion of the handle bar, operating wires inserted into the handle bar, each of the operating wires having an upper end respectively retained by each of the slide members and a lower end attached to the locking mechanisms, and slide guide projections projecting from upper and lower sides of each of the slide members and an operating grip rotatably mounted on the surface of the handle bar, the operating grip having U-shaped guide grooves formed therein into which the slide guide projections are received. In this manner, the slide members can slide in the horizontal directions in the handle bar in response to rotation of the operating grips to thereby actuate the locking mechanisms.

10 Claims, 5 Drawing Sheets

HANDLE BAR FOR BABY CARRIAGE

This is a continuation of application Ser. No. 07/770,813 filed Oct. 4, 1991, now abandoned.

BACKGROUND OF THE INVENTION

1. Field of the Invention

The present invention relates to a handle bar for a baby carriage, and particularly to a handle bar for a baby carriage in which an operating mechanism for adjusting the upright position of the handle bar and for folding the baby carriage is disposed at the handgrip portion of the handle bar.

2. Background

Conventionally, a mechanism is mounted on the handgrip portion of a handle bar of a baby carriage to actuate a cable mechanism or the like for folding the baby carriage. In such a mechanism, an operating lever for operating an adjustment wire is projected toward the inside of the handle bar. In operation, the operating lever has to be manually pivoted either rightward or leftward. The problem associated with this mechanism is that it requires more than a single touch operation. For example, in Japanese examined patent publication No. 56-20216, operating levers are individually disposed at right and left side portions of the handle bar. Thus, in order to change the position of the handle bar or to fold the baby carriage, each of the levers have to be individually operated.

SUMMARY OF THE INVENTION

An object of the present invention is to overcome these problems and suitably meet the above-mentioned demands and to provide a handle bar for a baby carriage which is provided with rotatable operating grips on the handgrip portion thereof which operate wire cables disposed in the handle bar so that the folding operation of the body of the baby carriage can be effected.

The invention resides in a structure of a handle bar for a baby carriage, the handle bar including a mechanism for locking the upright position of the handle bar or for folding the baby carriage. The mechanism has a hollow tubular construction in its inner portion and is bent in a U-shape or an inverted U-shape as viewed from its front. The handle bar comprises a pair of slide members each of which is slidably disposed along the central portion of said handle bar; operating wires inserted into the handle bar, each of the operating wires having an upper end retained in each of the slide members; slide guide projections projecting from upper and lower sides of each of the slide members; and operating grips rotatably mounted on the surface of the handle bar and having a pair of U-shaped slide guide grooves formed therein into which the slide guide projections are received such that the slide members can slide in the horizontal directions in the handle bar in response to rotation of the operating grips.

BRIEF DESCRIPTION OF THE DRAWINGS

FIGS. 1 to 5 illustrate an embodiment of a baby carriage having a folding operation mechanisms at lower end portions of a handle bar for folding the baby carriage while

FIG. 1 is a perspective view showing the baby carriage;

FIG. 3 is a side view of a baby carriage in the folded state;

FIG. 4 is a cross-sectional view of the operating mechanism of the baby carriage;

FIG. 6 is a perspective view of a baby carriage showing another embodiment of the present invention.

DETAILED DESCRIPTION OF THE PREFERRED EMBODIMENTS

Embodiments of the present invention will now be described with reference to the drawings.

The embodiment illustrated in FIGS. 1-5 is directed to a baby carriage in which the mechanisms for folding the carriage are disposed at the lower end portions of the handle bar. According to another embodiment illustrated in FIG. 6, the upright position of the handle bar can be adjusted forwardly and backwardly with respect to the seat portion of the carriage.

Figure 1:
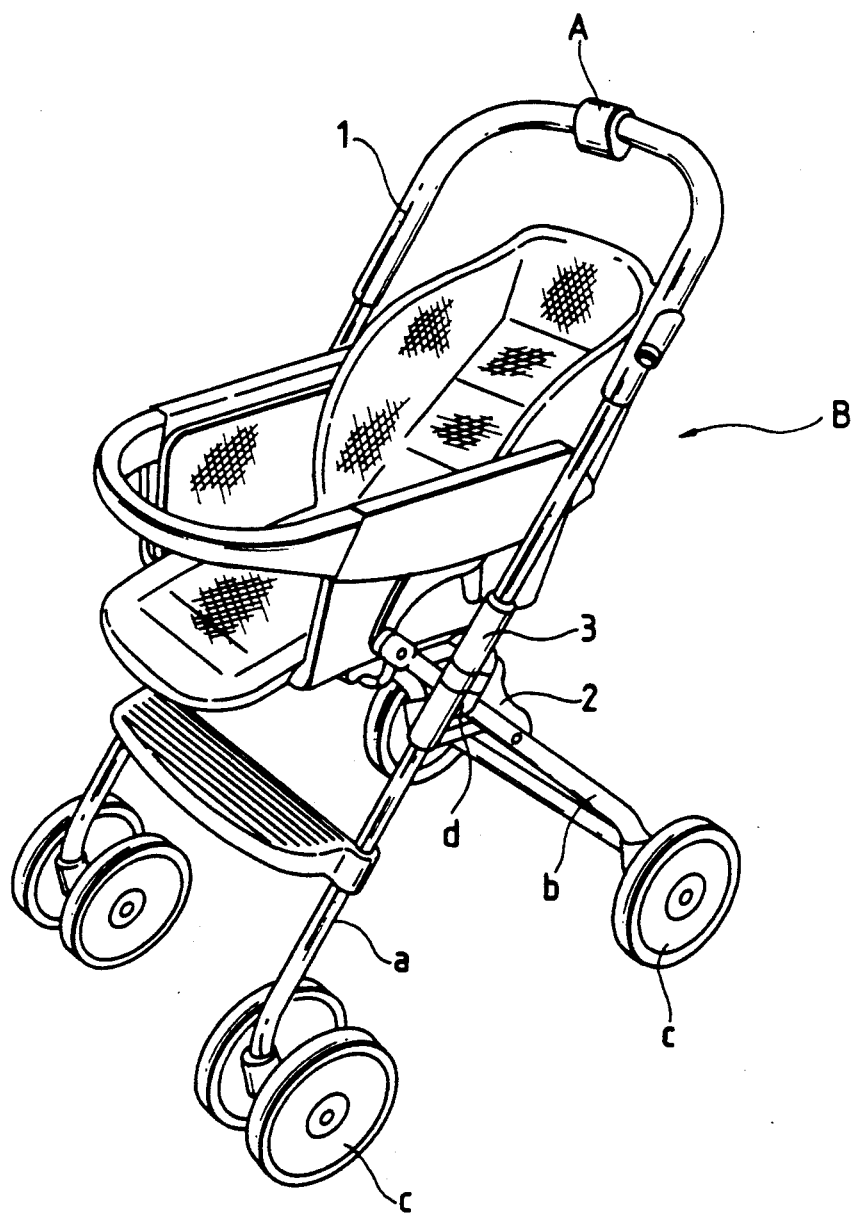

Referring to FIG. 1, a baby carriage B has front leg bars (a) having wheels (c) at lower ends thereof, rear leg bars (b) having wheels (c) at lower ends thereof and a handle bar 1 whose lower end portions are attached to the upper portions of the front leg bars (a) extending along the axial direction thereof such that they appear to form a continuation of the front leg bars (a). The upper ends of the front leg bars (a) are pivoted at portions (d) near the upper end portions of the rear leg bars (b) such that the front leg bars are collapsible. Thus, the baby carriage is substantially X-shaped as viewed from its side.

Brackets 2 support the lower portion of the handle bar 1. Specifically, the upper end portion of each bracket 2 is pivotally secured to the lower portion of the handle bar and the lower end portion of each bracket is pivotally secured to an intermediate portion of the rear leg bar (b).

The brackets 2 serve to support the lower end portions of the handle bar 1 and are utilized for retaining the baby carriage B in the erected position. Into each of fitting grooves 21 cut out at the upper end portion of the bracket 2 is fitted and engaged each of retainer shafts 31, a short length of which is projected to the inner side face of a stopper 3.

An engaging hook 32 disposed at one end portion of each of the stoppers 3 is detachably engaged with a hook retaining means (h) formed at an upper portion of each front leg bar (a), so that the erected position of the baby carriage B can be maintained. Alternatively, in the case of the embodiment illustrated in FIG. 6, engaging hooks 32, 32 project in a wing-like manner from opposite sides of each stopper 3 and are retained on retainer shafts h1, h2 respectively projecting from the front and back sides of each of armrest members (e), so that the handle bar 1 can be alternatively positioned forwardly (as shown by the dot-dash line) or backwardly of the baby carriage.

Figure 4:
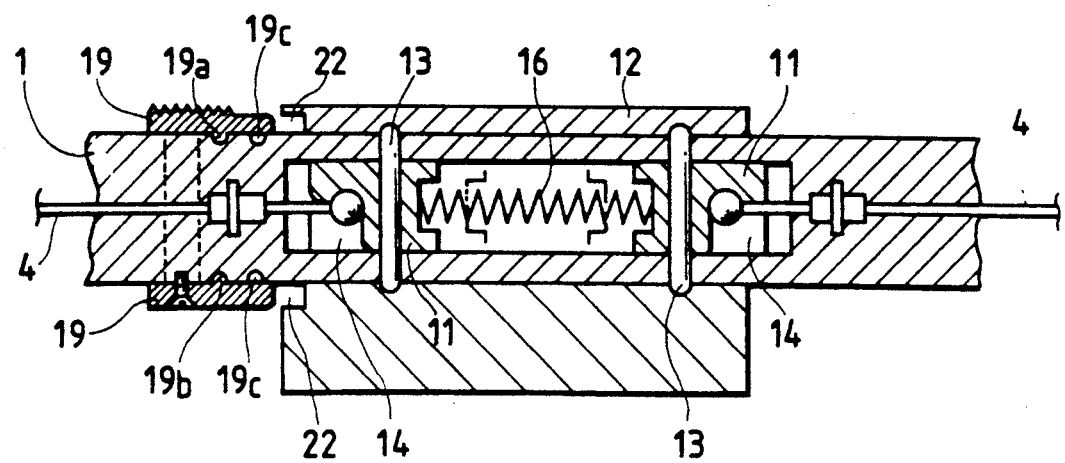

The stoppers 3 are disposed at the lower end portions of the handle bar 1 and are slidably disposed thereon such that they can each be raised or lowered along the axial direction of the handle bar 1 by operating wires 4. The operating wires 4 slide in response to rotation a slide operation mechanism A disposed at the handgrip portion of the handle bar 1. The lower end portions of the operating wires 4 are each secured to the stoppers 3 by retainer shafts 33 and the upper end portions of the operating wires 4 are secured to slide members 11 slidably mounted in the slide operation mechanism A, as illustrated in FIG. 4.

A spring 34 interconnects each of the retainer shafts 33 to the lower end portions of the handle bar 1 to urge each of the stoppers 3 downwardly. A longitudinally extending slide groove 35 is provided in the lower end portion of the handle bar 1 for accommodating each of the retainer shafts 33.

Figures 5A, 5B:
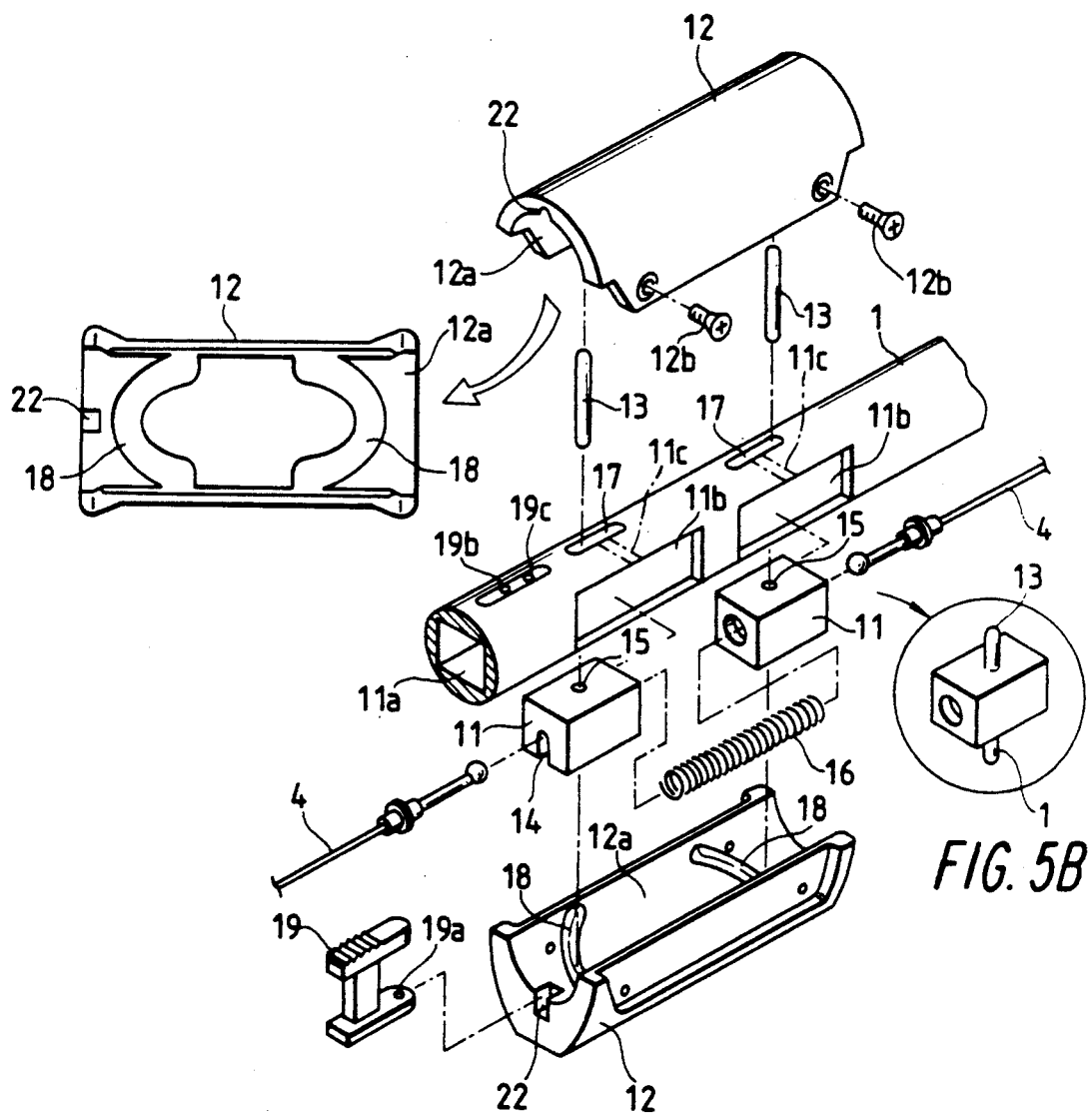
FIG. 5(A) is an exploded perspective view of the operating mechanism.
FIG. 5(B) is a perspective view of a slide member of FIG. 5(A)
Figure 6:
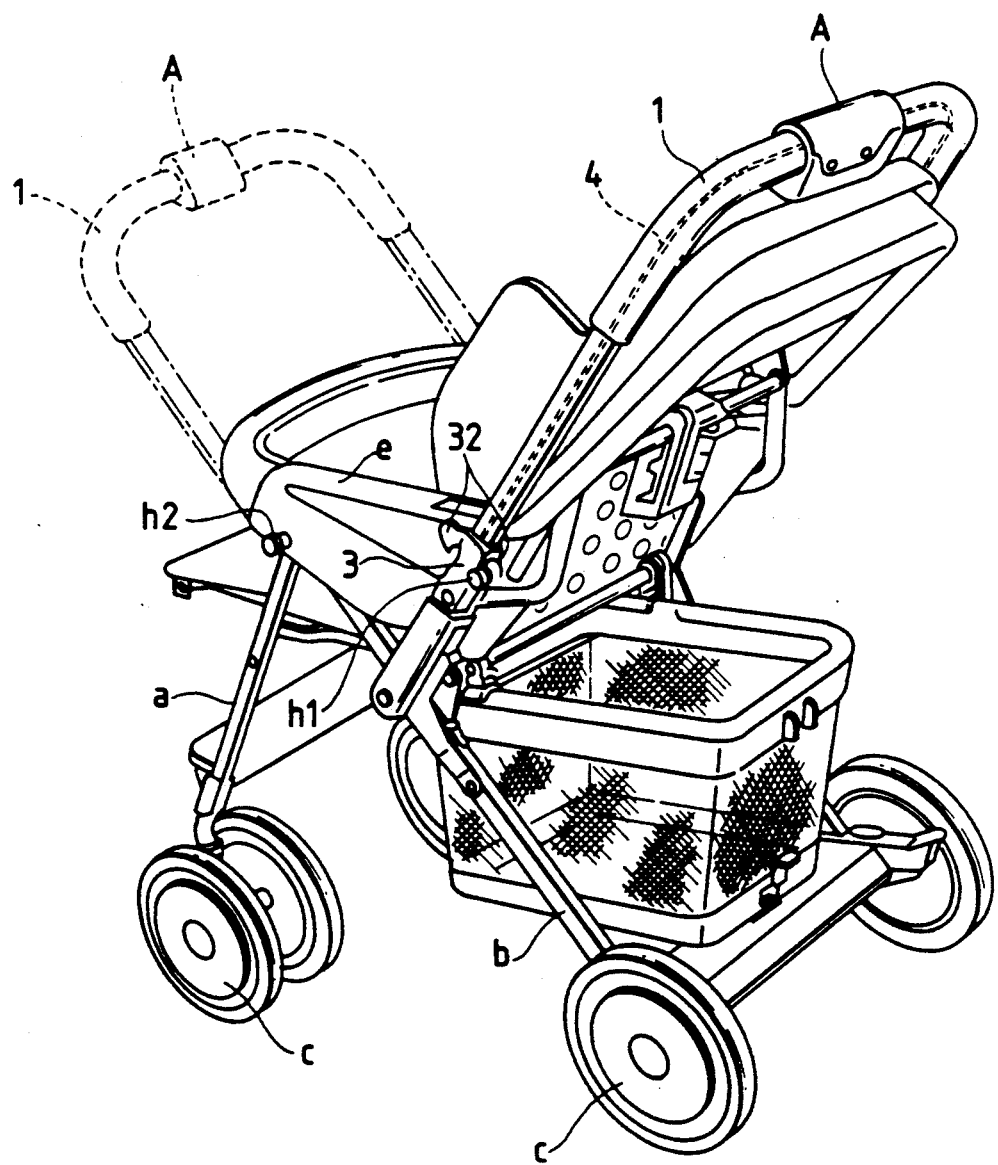
FIG. 6 illustrates an embodiment provided with mechanisms for changing the upright position of a handle bar where the mechanism is disposed at the lower end portions thereof. Specifically, in the drawing.

Referring to FIG. 5(A), the slide operation mechanism A constitutes an important part of the present invention and comprises the slide members 11, 11 slidably accommodated in the handle bar 1, operating grips 12, 12 for operating the slide members 11, 11 and slide guide pins 13, 13 for actuating the slide members 11, 11 by interlocking them with the operating grips. Each of the slide members 11 are sized to be slidably received in a hollow portion 11a formed in the handle bar 1. An engaging groove 14 for accommodating each of the operating wires 4 is formed by cutting out a part of each of the slide members 11, 11. Additionally, a vertically disposed insertion hole 15 is provided in each of the slide members for receiving slide guide pin 13 such that the pin extends from opposite ends of each slide member. Insertion holes 11b, 11b are provided in the handle bar 1 for allowing the slide member to be positioned in the hollow portion 11a.

In this embodiment, although each slide member 11 and the slide guide pins 13 are individually formed and arranged as described above, the invention is not to be restricted to this arrangement. For example, as illustrated by FIG. 5(B), slide projections 13, 31, each having a length corresponding to the projected height of the slide guide pin 13, project from the upper and lower faces of the slide members 11 such that they engage the slide guide grooves 18 formed in the operating grips 12. In this case, it may be necessary to form guide grooves 11c on the handle bar for inserting the slide guide pins 13 therethrough.

A resilient spring 16 extends between the confronting faces of the two slide members 11, 111 with opposite ends of the spring contacting the two slide members so as to urge the slide member away from one another. Horizontally extending slide grooves are provided in upper and lower portions of the handle bar 10 for accommodating the sliding movement of the slide members 11, 11. The semicircular shaped operating grips 12, 12 are respectively provided with corresponding semicircular cavity portions 12a, 12a on the inner side faces thereof. These cavity portions 12a, 12a are formed as contact portions to contact the handle bar 1. The two cavity portions 12a, 12a are arranged so as to oppose each other with the handle bar 1 sandwiched therebetween. The operating grips 12, 12 are tightly fastened to each other by means of screws 12b, 12b or secured to each other by other engaging means.

In this embodiment, although the operating grip is formed by connecting two components with each other, the invention is not to be limited to this structure. The two operating grips may be replaced by one cylindrical member and structural portions such as the slide guide grooves may be formed in this cylindrical member.

U-shaped slide guide grooves 18, 18 are formed in the cavity portion 12a of each of the operating grips 12. These guide grooves 18, 18 are dimensioned to receive the end portions of the slide guide pins 13, and are shaped such that the upper portions of each of the U-shaped grooves project toward each other.

Since the assembled operating grip 12 serves to prevent the slip of a handgrip portion when rotating the operating grip 12 and to enhance the gripping effect, the operating grip 12 may have an oval shape or any other shape as an alternative to the circular cross-sectional shape.

A stopper 19 is slidably mounted in a slide groove 20 formed on the handle bar for restricting the rotation of each of the operating grips 12. An end portion of the stopper is disengageably fitted into a fitting groove 22 formed at the end portion of each of the operating grips 12. An engaging projection 19a projecting from the rear face portion of the stopper 19, is selectively fitted into recessed portions 19b or 19c formed in the handle bar 1. In this connection, in the case where each of the stoppers 19 is placed in a released position, each of the recessed portions 19b serves to maintain the e released state thereof with the stoppers disengaged from the fitting grooves 22, so that each of the operating grips 12 can freely rotate. Each of the other recessed portions 19c serves to maintain the rotation restricted state of the end portion of the stopper 19 fitted into the fitting groove 22.

The construction of the engaging projection 19a and the recessed portions 19b, 19c may be modified. That is, the recessed portions may be formed in the stoppers 19 and the engaging projection may be formed in the handle bar 1.

In this embodiment, although all the mechanisms of the slide operation mechanism A are formed within the handle bar 1 of the baby carriage B (i.e., the two slide members 11, 11 are so disposed as to be slidable in the hollow portion at the central portion of the handle bar 1 and the operating grips 12, 12 are rotatably mounted on the surface of the handle bar 1), the invention is not to be restricted to this construction. For example, a slide operation mechanism A (not shown) having rotatably disposed operating grips 12, 12 may be previously formed as an individual member. This slide operation mechanism A may then be attached at the intermediate portion of the handle bar 1. Additionally, it will be readily appreciated that the construction of the stoppers 19 for restricting the rotation of the operating grips 12, 12 and their disposed positions may be freely modified by any other construction or positions than those illustrated in this embodiment.

Figure 3:
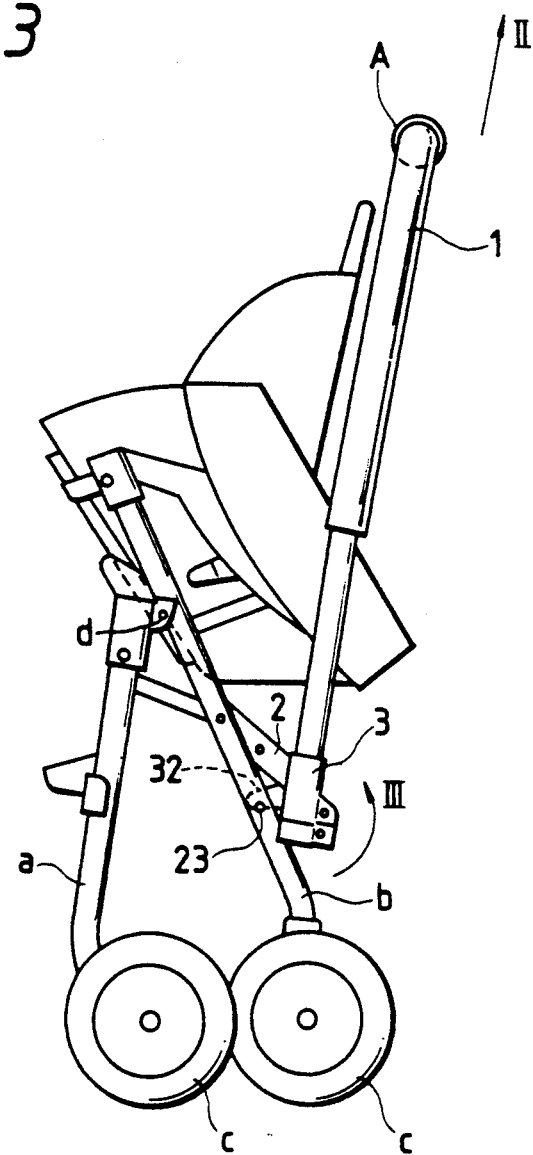

Referring to FIG. 3, reference numeral 23 designates each retainer shaft disposed at a portion near the lower end portion of each of the rear leg bar (b). The retainer shafts 23 are adapted to maintain the folded state of the baby carriage B by engaging the engaging hooks 32 of the stoppers 3 therewith when the body of the baby carriage B is folded. A seat portion 5 is detachably disposed on the body of the baby carriage B. Specifically, retainer shafts 51 provided at opposite sides of the seat portion are detachably engaged with engaging portions 6 formed on the body of the baby carriage B.

The folding operating of the present invention having the above-mentioned construction will be now described below by referring to an embodiment illustrated in FIGS. 1 to 5.

(1) The following step are conducted in folding the baby carriage:

1. Initially each of the stoppers 191 with its end portion fitted into the fitting groove 22 of each of the operating grips 12, is retracted from its engaged position to allow the operating 12 to be rotated. That is, the engagement of the engaging projection 19a 19 with the recessed portion 19c is released, and the engaging projection 19a is fitted into the recessed portion 19b for fitting.

2. Then, the operating grips 12, 12 are rotated either in a forward or backward direction of the handle bar 1.

3. When the operating grips 12 are rotated the slide guide pins 13, 13, the end portions of which are fitted into the side guide grooves 18, 18, move from the top portions of the slide guide grooves 18, 18 to any one of the other positions continuously extending to opposite sides therefrom.

4. Since each of the slide guide pins 13 is passed through the insertion hole 15 formed in each of the slide members 111 the slide guide pin 13 slides in response to the rotation of the operating grip 12, which causes the slide members 11 integrated therewith to also slide in the same direction as the sliding direction of the slide guide pin 13. As a result, each of the operating wires 4, with their upper end portions retained in the slide members 11, is pulled upwardly. In this Case, the above-mentioned slide guide pins 13, 13 are passed through the slide grooves 17, 17 formed horizontally on the upper and lower faces of handle bar 1, so that the slide guide pins 13 slide in accordance with the U-shaped guide grooves 18, 18 so as to move horizontally without being influenced by the U-shaped flexures.

5. When the operating wires 4 slide upwardly, the stoppers 3, disposed at the positions near the lower end portions of the handle bar 1 in an elevatable manner, also slide upwardly so that the engagement between the engaging hooks 32 formed at the end portions of the stoppers 3 and the hook retaining means (h) is released.

6. When the engagement of the stoppers 3 is released, the grip operation of the operating grips 12 is released at that position so that the two slide members are instantaneously moved toward separate and opposite positions due to the resilient force of the spring 16 interposed therebetween. Consequently, the slide members 11, 11 are returned to their original positions.

7. When the slide members 11, 11 return to their original positions, the stoppers 3, engaged with the lower ends of the operating wires 4, likewise descend along the handle bar 1 due to the contraction force of the springs 34 and are brought into such a state as to achieve an engagement state again.

8. Since the handle bar 11 whose engagement through the stoppers 3 is released, has no means for retaining its engaged state, the handle bar 1 is collapsed in the direction shown by arrow x in FIG. 2 about the pivoted portions of the bracket 2. Thus, the baby carriage can be folded in accordance with the above-mentioned movement of the handle bar 1, as illustrated in FIG. 3.

9. When the body of the baby carriage B is folded and the stoppers 3 descend toward the lower end portions of the rear leg bars (b), the engaging hooks 32 disposed on the stoppers 3 automatically engage with the retainer pins 23 disposed near the lower end portions of the rear leg bars (b). Thus, the folding operation of the baby carriage is automatically completed.

10. When the folding operation is completed, the end portions of the stoppers 19 are fitted into the fitting grooves 22 formed in the operating grips 12, 12, and the respective engaging projections 19a formed on the lower face portions of the respective stoppers 19 are fitted into the recessed portions 19c such that the operating grips 12, 12 and the stoppers 19 do not rotate.

(2) In the case where the baby carriage is assembled, the operation may be effected in a totally reversed manner to the above-mentioned folding operation, as follows:

1. Initially, the engagement of the stoppers 19 retained in the operating grips 12, 12 of the handle bar in the folded state (i.e., the engagement of the engaging projections 19a into the recessed portions 19c) is released and the stoppers are released. Then, the engaging hooks 32 disposed on the stoppers 3 are disengaged from the retainer pins 23 disposed on the rear leg bars (b) by rotating the operating grips 12, 12.

2. When the engagement of the stoppers 3 with the rear leg bars (b) is released, the handgrip portion of the handle bar 1 in the folded state, as illustrated in FIG. 3, is raised in the direction shown by arrow y so that the brackets 2 and the handle bar 1 rotate in the direction shown by arrow z.

Figure 2A:
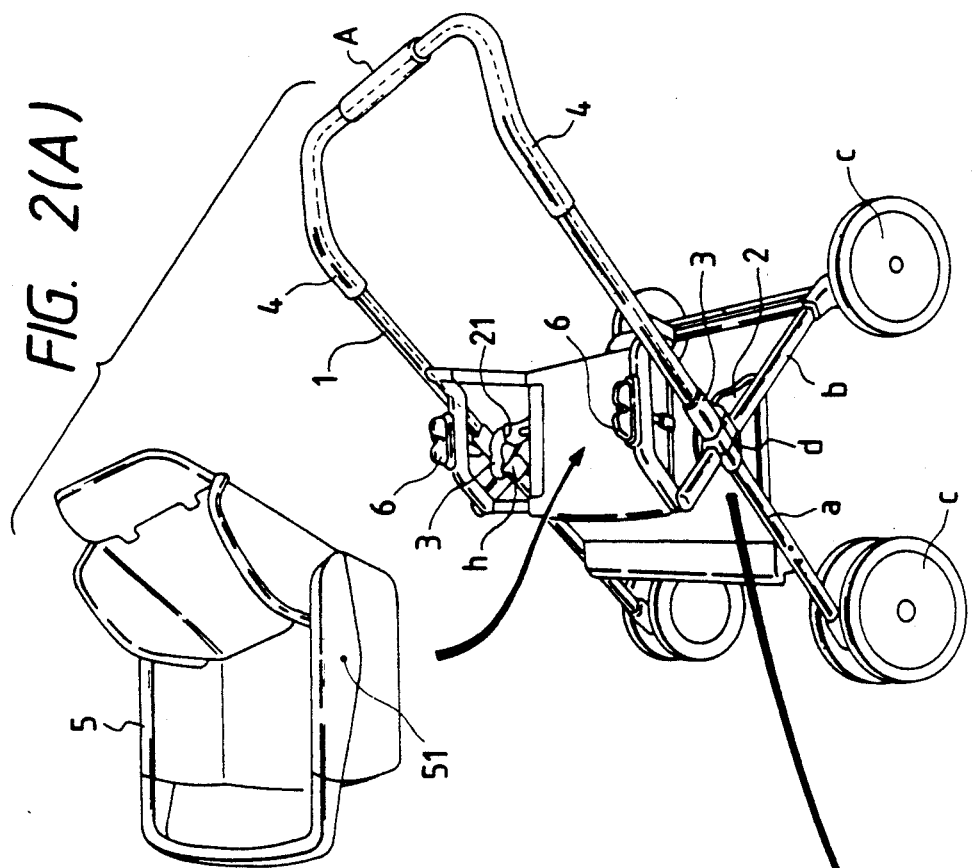
FIG. 2(A) is an exploded, fragmentary, enlarged perspective view showing the operating process of stopper mechanisms disposed at the lower end portions of the handle bar.
Figure 2B:
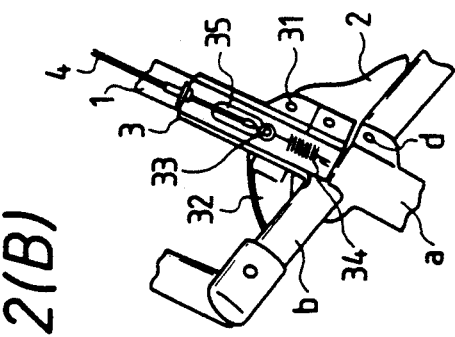
FIG. 2(B) illustrates the stoppers in an engaged state where the baby carriage is locked in an upright position.
Figure 2C:
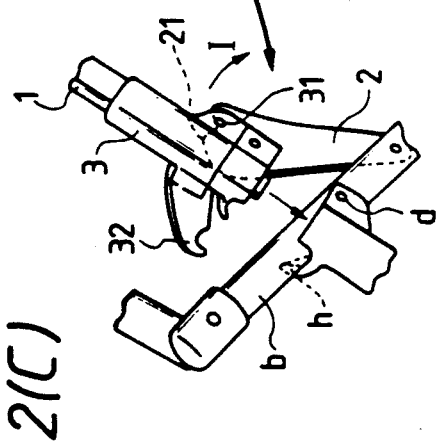
FIG. 2(C) illustrates the stoppers in a disengaged state to allow the baby carriage to be collapsed.

When the brackets 2 and the lower end portions of the handle bar 1 are raised upwardly, the body of the baby carriage B is assembled in a state as illustrated in FIGS. 1 and 2 in accordance with this movement.

3. With the above operation, the lower end portions of the handle bar 1 are located at the upper ends of the pivoted portions of the front leg bars (a) and the rear leg bars (b). As a result, the engaging hooks 32 disposed on the stoppers 3 automatically engage with the hook retaining means (h) formed above the upper end portions of the front leg bars (a). Thus, the assembling operation of the baby carriage B is completed.

Since the present invention has, as mentioned above, the construction in which the operating grips 12, 12 are disposed at the central portion of the handgrip portion of the handle bar the rotating operation of the operation grips 12, 12 can be effected, while the handle bar 1 is gripped, thereby achieving simple operation. The releasing operation of the engaging mechanisms can therefore, be effected with ease.

Particularly, according to the present invention, since the operating grips 12, 12 for sliding the operating wires 4 are so mounted on the handle bar 1 as to extend therealong, the rotating operation thereof can be effected by simply gripping the handle bar 1 with a hand.

Since the present invention is not provided with a projecting mechanism or lever as in the case of the conventional mechanism, the operation mechanism can be handled safely.

What is claimed is:

1. An operating mechanism disposed on a handle bar of a baby carriage for actuating locking mechanisms disposed at opposite ends of the handle bar which lock said handle bar at a predetermined position or lock the baby carriage in a folded or an unfolded position, said handle bar having a hollow tubular construction and being bent in a U-shape or an inverted U-shape as viewed from its front, said operating mechanism comprising:
- a pair of slide members each of which is slidably disposed at the central portion of said handle bar;
- operating wires inserted into said handle bar, each of said operating wires having an upper end respectively retained by each of said slide members and a lower end attached to said locking mechanisms;
- slide guide projections projecting from upper and lower sides of each of said slide members; and
- an operating grip rotatably mounted on the surface of said handle bar, said operating grip having U-shaped guide grooves formed therein into which said slide guide projections are received such that said slide members can slide in the horizontal directions in said handle bar in response to rotation of said operating grips to thereby actuate said locking mechanisms.

2. The operating mechanism of claim wherein each of said slide projections projecting from upper and lower sides of said slide members includes a single pin extending through each of said slide members and projecting from opposite upper and lower sides thereof.

3. The operating mechanism of claim 1 wherein each of said slide projections includes a pair of pins, one pin extending from the upper side of each of said slide members and the other pin extending from the lower side of each of said slide members.

4. The operating mechanism of claim wherein said handle bar includes horizontally and longitudinally extending grooves into which each of said guide projections are disposed to ensure that said guide members move horizontally without rotating.

5. The operating mechanism of claim wherein said U-shaped grooves are arranged such that top portions of the U-shapes are projected toward each other.

6. The operating mechanism of claim further comprising a spring for urging said slide members away from one another, said spring being disposed between said two slide members.

7. The operating mechanism of claim further comprising means for alternatively locking said operating grip such that said grip cannot be rotated or allowing said grip to rotate.

8. The operating mechanism of claim 7, wherein said operating means comprises a stopper slidably disposed in said handle bar and adjustable between a position engaged with said operating grip or a position disengaged from said operating grip.

9. The operating mechanism of claim wherein said operating grip include two semicircular members fixedly attached to one another.

10. The operating mechanism of claim wherein said handle bar has a pair of openings for allowing said slide members to be inserted therein.

* * * * *